Patented Nov. 21, 1922.

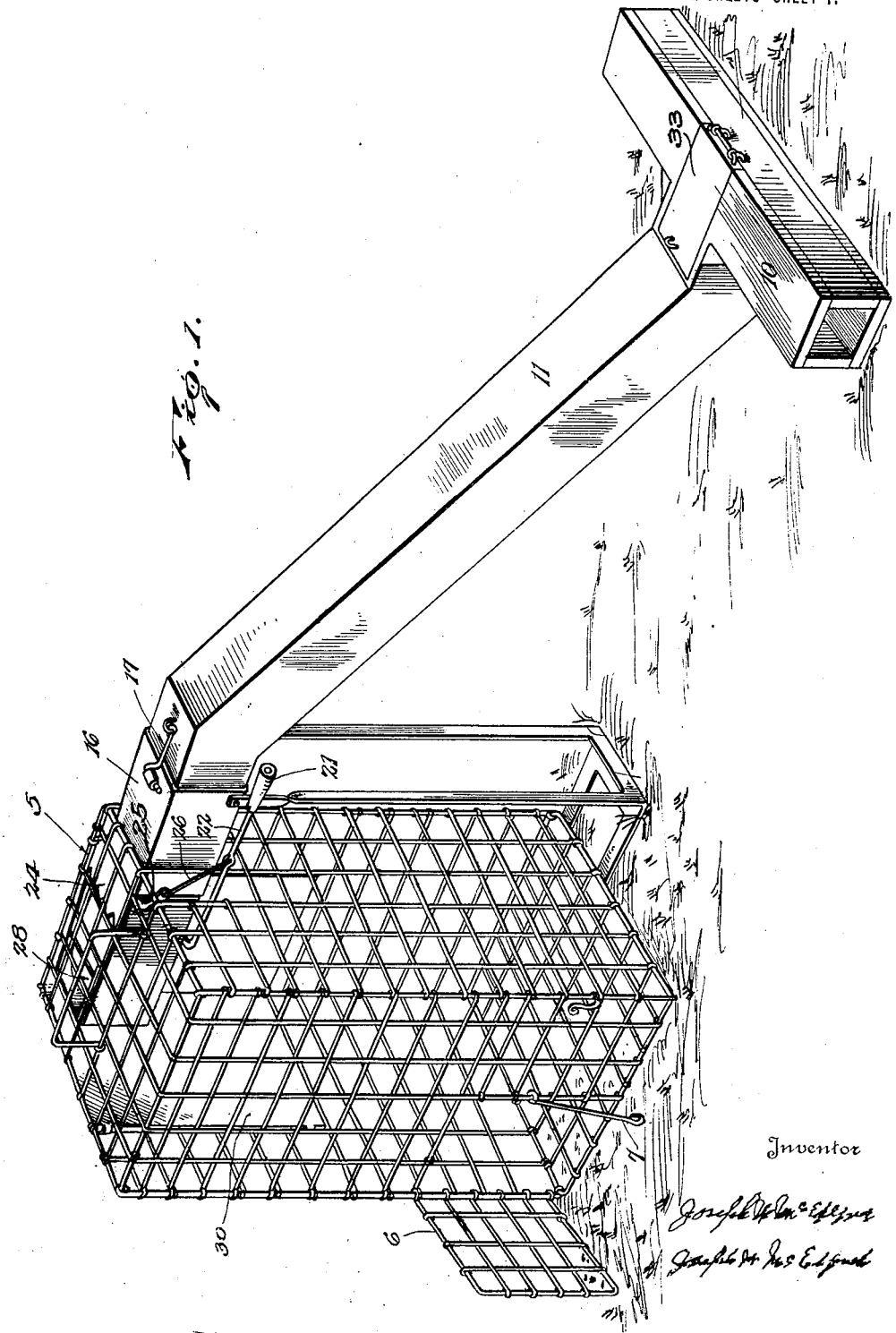

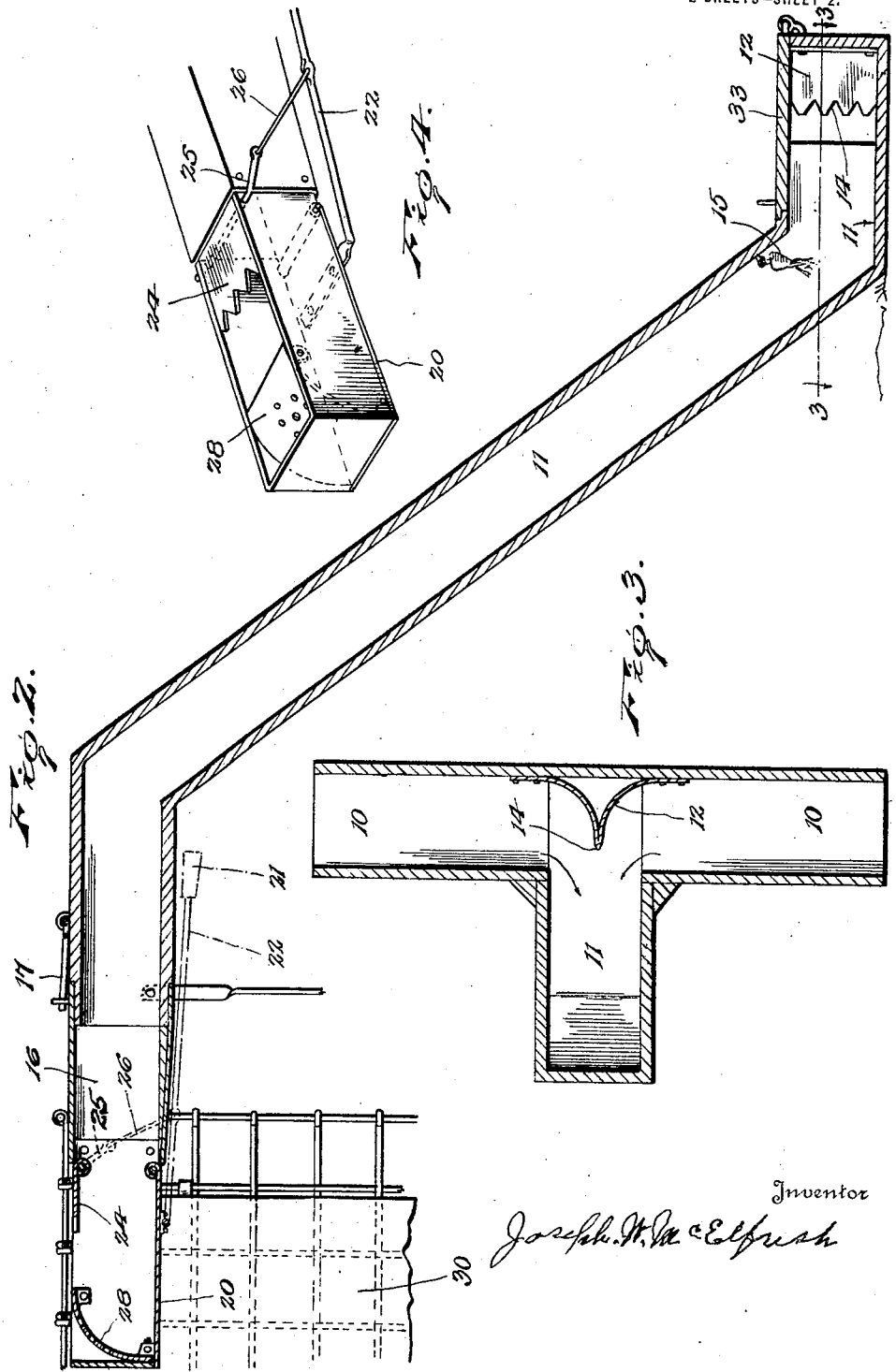

1,436,272

UNITED STATES PATENT OFFICE.

JOSEPH W. McELFRESH, OF AGRA, OKLAHOMA.

ANIMAL TRAP.

Application filed December 29, 1921. Serial No. 525,627.

*To all whom it may concern:*

Be it known that I, JOSEPH W. McEL-FRESH, a citizen of the United States, residing at Agra, in the county of Lincoln and State of Oklahoma, have invented certain new and useful Improvements in Animal Traps, of which the following is a specification.

This invention relates to traps and has for its object to provide novel means whereby the animals are prevented from escaping upon being trapped.

A further object is to provide a trap having an inlet runway provided with a V-shaped baffle which effectively prevents the return of the animals through the runway.

A further object is to provide a trap of the character specified which is of highly simplified construction, durable in use and cheap to manufacture.

Other objects and advantages will be apparent during the course of the following description.

In the accompanying drawing forming a part of this application and in which like numerals are employed to designate like parts throughout the same, Figure 1 is a perspective of the improved trap.

Figure 2 is a detail vertical sectional view through the same, the view illustrating the runway.

Figure 3 is a horizontal sectional view taken on line 3—3 of Figure 2.

Figure 4 is a perspective of an animal inlet member embodied in the invention.

In the drawing wherein for the purpose of illustration is shown a preferred embodiment of the invention the numeral 5 generally designates a cage or receiver for the animals, the said receiver being provided with a hinged door 6 through which the animals trapped may be removed. The door may be provided with a latch 7 in the nature of a link having means whereby the same may be engaged with the door.

The animals may enter either one of the lateral branches 10 of the runway 11 and upon entering either one of the lateral passages 10 the animals are directed into the runway by means of a V-shaped baffle or guide designated by the numeral 12. The baffle 12 is formed from a single length of metal bent into V-shaped formation and the apex of the V is formed with a plurality of teeth 14 which prevent the animals from escaping by way of the lateral passages. The animals are induced to enter the runway by means of bait 15 located in any desired place within the runway.

The runway 11 is inclined and has its upper portion extended angularly and connected to a second runway 16 by means of one or more fastening devices 17. The second runway 16 extends into the receiver 5 and is provided with a hinged platform 20 normally held in a horizontal position by means of a weight 21 adjustably mounted upon a rearwardly extending lever 22. The lever 22 has its forward portion extended angularly and secured to the under side of the platform 20 at a point spaced from its ends. With reference to Figure 2, it will be seen that when the animal goes on through the runway 16 and stands upon the platform 20 the platform will move downwardly so that the animal will drop into the receiver.

As the tilting platform moves downwardly a gate 24 arranged at the rear end of the platform is swung downwardly so that the animal will be positively prevented from returning to the runway 16. As illustrated particularly in Figures 1 and 4, the gate 24 has its upper end connected to a horizontally arranged crank 25 which in turn is connected to a link 26. The link 26 is connected to the lever 22 so that when the lever is moved upwardly as the result of the downward movement of the platform, the gate will be moved to its operative or vertical position whereby the animal will be prevented from retracing his steps.

At the forward end of the second runway 16 the same is provided with a curved plate 28 which directs the animal downwardly into the receiver. At the outlet end of the second runway 16, the receiver is provided with a metal plate 30 which is perfectly smooth on its inner side so that the animal will be unable to grip the upper portion of the receiver and support himself above the bottom of the same.

In operation, the animal enters by way of the lateral branches 10 and travels upwardly through the runways 11 and 16. As previously stated, when the animal walks onto the pivoted platform, the platform moves downwardly so that the animal is discharged into the receiver. By reason of the construction employed the trap is always set and requires a minimum of attention on the part of the operator. The bait may be renewed through a door 33 in the upper side of the runway.

I claim:—

1. A trap comprising a runway having laterally projecting inlet branches, and a baffle of V-shaped formation having its apex arranged at the juncture of said branches and formed with teeth.

2. A trap comprising a runway having an inclined portion and a pair of laterally projecting inlet branches, a baffle formed within said branches and having its apex at the lower end of said inclined portion, a second runway connected to said first named runway and having trapping means, and a receiver supporting said second runway.

In testimony whereof, I have affixed my signature in the presence of two witnesses.

JOSEPH W. McELFRESH.

Witnesses:
CLAUDE McLAUGHLIN,
J. W. GREEN.